July 21, 1936.  R. A. BABEL  2,048,420
BRAKE
Filed May 4, 1931
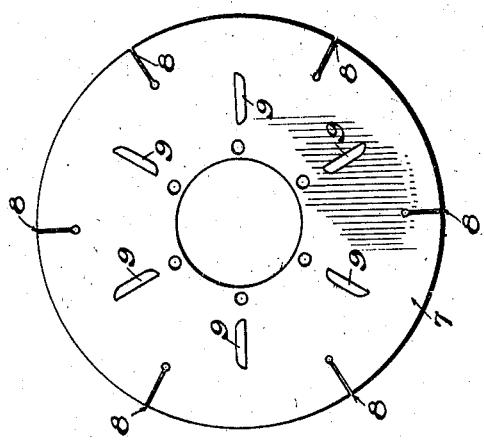
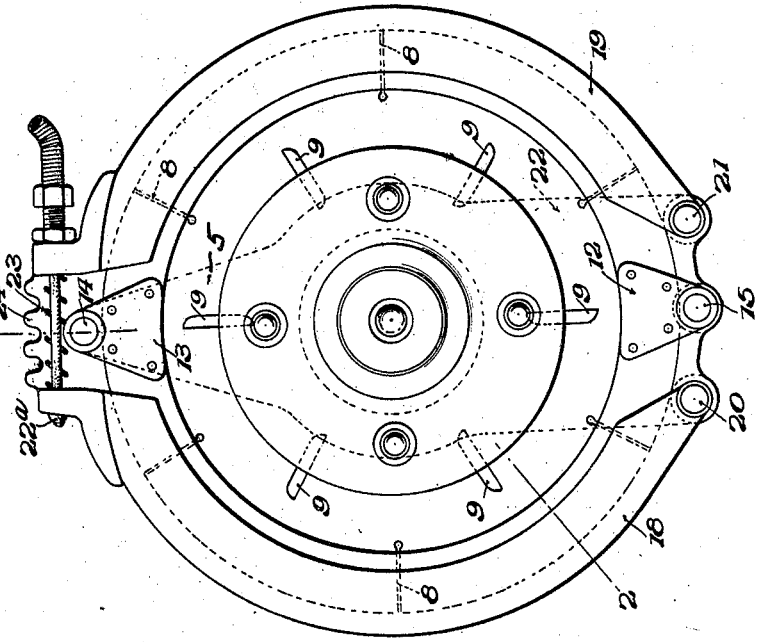
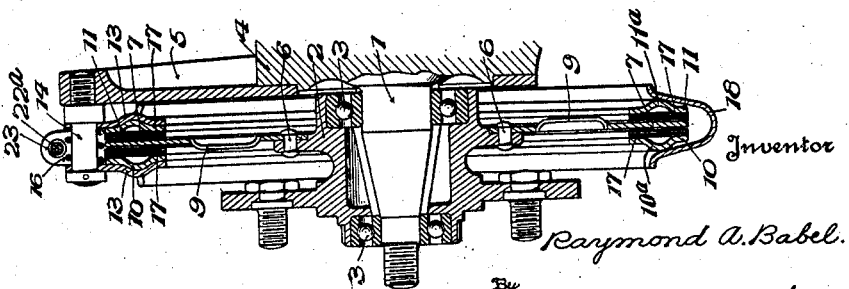
Inventor
Raymond A. Babel.
By M. W. McConkey
Attorney Patented July 21, 1936

2,048,420

UNITED STATES PATENT OFFICE 2,048,420

BRAKE

Raymond Alexandre Babel, Clichy, France, assignor to Bendix Brake Company, South Bend, Ind., a corporation of Illinois Application May 4, 1931, Serial No. 535,027
In France May 6, 1930

7 Claims. (Cl. 188—72)

This invention relates to brakes and more particularly brakes for vehicle wheels.

An object of this invention is to provide novel means for braking the rotating wheels of a vehicle in a gradual and progressive manner.

Another object of this invention is to provide novel braking means in which the braking force is exerted axially of the shaft the rotation of which is to be stopped.

Another object of this invention is to provide a novel braking device in which the braking is effected by means of pressure exerted on a rotating disk by rings which are slidable to and from the disk.

A further object of the invention is to provide novel actuating means for effecting the sliding movement of the braking rings to and from the disk.

Other objects and features of novelty will be apparent from the following detailed description when taken in connection with the accompanying drawing.

In the drawing wherein similar reference characters refer to like parts throughout the several views:

Fig. 1 is a view showing the side elevation of the brake.

Fig. 2 is a section on the line 2—2 of Fig. 1.

Fig. 3 is a detail view, on a smaller scale, of the braking disk.

In the form of invention illustrated there is shown the spindle 1 of a conventional axle. Positioned on the spindle 1 is a hub 2, rotation of such hub on the spindle being freely allowed by means of ball bearings 3. The spindle is formed integrally with a stationary axle member 4 which carries, in any suitable manner, a fixed, non-rotatable arm 5, the function of which will be described in detail hereinafter.

Carried by the hub 2 and rigidly fixed thereto in any suitable manner, preferably by rivets 6 as illustrated, is a disk member 7, such disk being, of course, rigid with the hub and wheel and rotating therewith. Disk 7 is provided, as illustrated in Fig. 3 of the drawing, with radial slots 8, the same extending a short distance inwardly from the periphery of the disk and being provided in order to prevent distortion by heat. The disk is also provided with cooling vanes 9, the same being disposed midway between the center and the periphery of the disk and being radially disposed.

Means are provided for braking the rotation of the disk, such means including rings 10 and 11 disposed on either side of the disk adjacent the periphery thereof. Such rings are provided with centrally located ribs 10a and 11a, extending longitudinally of the rings. Each ring is provided with two lugs 12, 13, disposed exteriorly of the rings and attached thereto by welding or other suitable means and being in diametrically opposite positions. Lugs 13 are provided with aligned openings to receive a pin 14 which is rigidly attached, by suitable means, to the arm 5. Disposed about shaft 14 is a compression spring 16, the ends of which bear against the interior faces of the lugs 13 and normally urge said lugs and the attached rings 10 and 11 away from disk 7. Lugs 12 are provided with openings to receive a pin 15, about which an interiorly of the lugs 12 is coiled a compression spring similar to spring 16, and which also serves to normally urge the rings 10 and 11 out of braking engagement with the disk 7. It will be understood, however, that rings 10 and 11 are free to slide on the pins 14 and 15 toward and away from the disk 7 against the force of the springs described. The braking rings 10 and 11 are each provided with facing members 17 which are composed of any suitable brake lining material for contacting with the disk 7.

Novel means are provided for positively urging the braking rings 10 and 11 into braking engagement with disk 7. Such means comprise two external shoe members 18 and 19, the same being respectively pivoted on pins 20 and 21 carried by a supporting member 22 which also carries pins 14 and 15. Shoes 18 and 19 are formed with a V-shaped cross-section, the braking rings 10 and 11 being disposed within the cross-section of the shoes. The free ends of the shoes are formed with angle members, the same having suitable means to receive a Bowden cable, such cable being attached to shoe 18 at 22 and passing loosely through the angle member carried by shoe 19. In order to cause the shoe 19 to contract in unison with the cable operated shoe 18, the cable conduit is secured to the shoe 19, and by reaction through the cable conduit the shoes 18 and 19 are urged toward each other simultaneously. A compression spring 23 surrounds the Bowden cable between the two angle members and normally urges the shoes out of contacting engagement with the braking rings 10 and 11. A cover 24 is provided to protect the operating parts of the brake from dust and water.

The operation of the device is caused by depression of the foot pedal by the operator. Such depression causes the Bowden cable to draw the free ends of the two shoes 18 and 19 together, pivoting such shoes about pins 20 and 21. Such contracting of the shoes forces the ridges of the braking rings 10 and 11 into the restricted part of the cross-section of the shoes and urges the rings into braking engagement with disk 7.

While there has been shown and described one embodiment of the invention, it is to be understood that the invention is not limited thereto. Various changes in the shapes, sizes and manner of assembling the various component parts may be resorted to without departing from the scope of the invention as will occur to those skilled in the art. Reference will therefore be had to the appended claims for a definition of the limits of the invention.

What is claimed is:

1. A braking device including a rotatable disk, annular rings disposed adjacent the sides of said disk, ribs on the rings, and means engaging said ribs to effect braking engagement between said rings and said disk including pivoted shoes embracing said ribs and movable in the plane of rotation of the disk.

2. A brake comprising a friction element including a disk having a plurality of radial slits extending inwardly part way and a plurality of cooling vanes inwardly disposed from the annular area having said slits.

3. A brake comprising a friction element including a disk having spaced radial slits extending inwardly part way from the outer edge and spaced radial cooling vanes inwardly disposed from the outer edge.

4. In a brake a friction element consisting of an annular disk member and an annular rib stamped centrally therein.

5. A brake comprising a rotatable disk having a plurality of radial slits and a plurality of radial cooling vanes, and friction elements adaptable for cooperation therewith including annular members having annular ribs and a contractible member embracing the annular members.

6. A brake comprising a rotatable disk having radial slits and radial cooling vanes, annular axially movable members adaptable for cooperation with the rotatable member, annular ribs on the axially movable members, and a contractible member including corresponding pivotal shoes straddling the axially movable members and embracing the annular ribs on the axially movable members.

7. In a braking mechanism, a rotating hub, a disk fixed thereon, a support, annular rings carried thereon and disposed adjacent the sides of said disk and normally urged therefrom, a plurality of shoes pivotally carried by said support, the cross section of said shoes surrounding said rings, and means for moving said shoes about their pivots for effecting braking engagement between said rings and said disk.

RAYMOND ALEXANDRE BABEL.